(12) United States Patent
Takahara

(10) Patent No.: US 9,533,455 B2
(45) Date of Patent: Jan. 3, 2017

(54) PUNCTURE REPAIR DEVICE

(71) Applicant: The Yokohama Rubber Co., LTD., Minato-ku, Tokyo (JP)

(72) Inventor: Hideyuki Takahara, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/654,431

(22) PCT Filed: Nov. 28, 2013

(86) PCT No.: PCT/JP2013/082059
§ 371 (c)(1),
(2) Date: Jun. 19, 2015

(87) PCT Pub. No.: WO2014/097848
PCT Pub. Date: Jun. 26, 2014

(65) Prior Publication Data
US 2015/0343723 A1    Dec. 3, 2015

(30) Foreign Application Priority Data

Dec. 20, 2012    (JP) .................................. 2012-278470

(51) Int. Cl.
| | | |
|---|---|---|
| *B29C 73/02* | (2006.01) | |
| *B29C 73/24* | (2006.01) | |
| *B29C 73/16* | (2006.01) | |
| *B60C 29/06* | (2006.01) | |

(52) U.S. Cl.
CPC ........... *B29C 73/025* (2013.01); *B29C 73/166* (2013.01); *B29C 73/24* (2013.01); *B60C 29/062* (2013.04)

(58) Field of Classification Search
CPC ..... B29C 73/025; B29C 73/166; B60C 29/062
USPC .................................. 141/38, 313; 137/223
See application file for complete search history.

(56) References Cited

U.S. PATENT DOCUMENTS

| | | | |
|---|---|---|---|
| 6,176,285 B1 * | 1/2001 | Gerresheim | .......... B29C 73/163 152/509 |
| 6,454,892 B1 | 9/2002 | Gerresheim et al. | |
| 6,889,723 B2 | 5/2005 | Eckhardt | |
| 2002/0121331 A1 | 9/2002 | Gerresheim et al. | |
| 2004/0216806 A1 | 11/2004 | Eckhardt | |

FOREIGN PATENT DOCUMENTS

| | | |
|---|---|---|
| DE | 195 45 935 | 1/1997 |
| EP | 1 123 795 | 8/2001 |
| JP | H09-118779 | 5/1997 |
| JP | H09-0118779 | 6/1997 |
| JP | 2005-145076 | 6/2005 |
| JP | 2010-036412 | 2/2010 |
| JP | 2010-194771 | 9/2010 |
| JP | 2010-253722 | 11/2010 |
| WO | WO 00/21875 | 4/2000 |

OTHER PUBLICATIONS

International Search Report for International Application No. PCT/JP2013/082059 dated Jan. 14, 2014, 4 pages, Japan.

* cited by examiner

*Primary Examiner* — Jason K Niesz
(74) *Attorney, Agent, or Firm* — Thorpe North & Western

(57) ABSTRACT

A puncture repair device of the present technology is provided with: a compressor; a vessel to which the compressed air from the compressor is supplied and that contains a puncture repair liquid that is pumped into the cavity of a tire; and a heating device that heats the puncture repair liquid.

18 Claims, 5 Drawing Sheets

PUNCTURE REPAIR DEVICE

TECHNICAL FIELD

The present technology relates to a puncture repair device that is used to repair a punctured tire.

BACKGROUND

A puncture repair device has been known in which, when a tire is punctured, by using compressed air generated by a compressor, a puncture repair liquid is pumped into a cavity of the punctured tire so as to be poured into a puncture hole, and further, the air is filled into the tire until a pressure therein reaches a predetermined inner pressure (see Japanese Unexamined Patent Application Publication No. 2005-145076A, as an example). By installing such a puncture repair device on a vehicle, it becomes unnecessary to install a spare tire on the vehicle. Thus, it is possible to realize a resources saving and weight reduction of the vehicle. Further, there is an advantage in which a space provided on the vehicle to install the spare tire can be used for other purposes.

However, in cold regions, it is assumed that such a puncture repair device is used in low-air-temperature environments (−10° C., for example). In such environments, viscosity of the puncture repair liquid becomes high, as the air temperature is low. Thus, in low-air-temperature environments, it may take a longer time to pump the puncture repair liquid into an interior of the tire and thus to repair a punctured tire, compared with in normal temperature environments (20° C., for example).

SUMMARY

The present technology provides a puncture repair device that can reduce the time to repair a punctured tire in low-air-temperature environments.

A puncture repair device is provided which includes a compressor, a vessel to which compressed air from the compressor is supplied and that contains a puncture repair liquid that is pumped into a cavity of a tire, and a heating device that heats the puncture repair liquid.

More specifically, it is possible to lower viscosity of the puncture repair liquid by heating the puncture repair liquid using the heating device.

According to the present technology, it is possible to reduce the time to repair a punctured tire in low-air-temperature environments.

BEST MODE FOR CARRYING OUT THE TECHNOLOGY (First Embodiment)

A puncture repair device 1 of a first embodiment will be described below with reference to FIG. 1 to FIG. 3.

Figure 1:
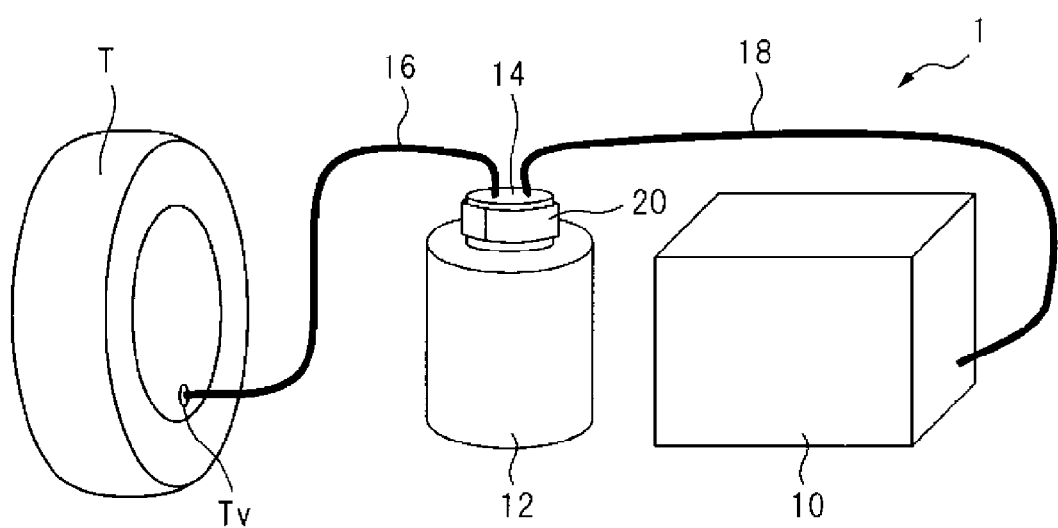
FIG. 1 is a schematic diagram illustrating a puncture repair device according to a first embodiment of the present technology.

FIG. 1 is a schematic diagram illustrating the puncture repair device 1 of the first embodiment. The puncture repair device 1 of the first embodiment is provided with a compressor 10, a vessel 12 to which compressed air from the compressor 10 is supplied, a cap 14 that is attached to an opening of the vessel 12, and a first hose 16 that causes an interior of the vessel 12 to communicate with a cavity of a punctured tire T.

In the first embodiment, the compressor 10 is a reciprocating compressor that includes a cylinder and a motor. However, other types of compressors, such as a rotary compressor, may also be used as the compressor 10.

The opening is provided in a top portion of the substantially cylindrical vessel 12, and the compressed air and a puncture repair liquid flow in and out of the vessel 12 passing through the opening. The interior of the vessel 12 contains the puncture repair liquid that is pumped into the cavity of the tire T. Further, the compressor 10 and the interior of the vessel 12 are communicatively connected by a second hose 18 that penetrates through the cap 14. Accordingly, the compressed air generated by the compressor 10 is supplied to the interior of the vessel 12.

The cap 14 is attached to the opening of the vessel 12 through which the puncture repair liquid passes, and the cap 14 seals the vessel 12. In the first embodiment, the cap 14 is a screw-type cap and is attached to the opening of the vessel 12. However, the cap 14 may be attached to the vessel 12 in any manner as long as the cap 14 can withstand a pressure of the compressed air generated by the compressor 10 and can keep the vessel 12 sealed.

An aluminum seal, for example, is attached to the opening of the vessel 12 before the cap 14 is attached thereto so that the puncture repair liquid contained in the interior of the vessel 12 is not exposed to the outside air. Note that the aluminum seal may be torn by a cutting edge (not illustrated in the drawings) of the cap 14, for example.

The first hose 16 penetrates through the cap 14, and one end of the first hose 16 is positioned at a bottom of the interior of the vessel 12 so as to completely pump the puncture repair liquid, which is contained in the interior of the vessel 12, into the tire T without leaving any residue. The other end of the first hose 16 is attached to a valve Tv of the tire T. Accordingly, the interior of the vessel 12 and the cavity of the tire T are communicatively connected via the first hose 16, and the puncture repair liquid pumped by the compressor 10 passes through an interior of the first hose 16.

In FIG. 1, the puncture repair device 1 is illustrated which is further provided with the heating device 20. In the first embodiment, the heating device 20 may be a heating device that utilizes heat of reaction arising from a chemical reaction caused by mixing chemicals, for example. This type of the heating device 20 includes a so-called disposable pocket warmer. The disposable pocket warmer is generally a bag containing iron powder, water, salts, activated carbon, a water retaining material, and the like and generates heat using the heat of reaction arising from a chemical reaction between the iron powder and the water by mixing them. Further, the heating device 20 may be of a type that generates heat by adding water to quicklime.

Alternatively, the heating device 20 may be of a type that uses electricity as its energy source and generates heat using electrically-heated wires, as in a hot carpet, an electric blanket, and the like. Note that power sources of the compressor 10 and/or the heating device 20 may be obtained from an in-vehicle cigarette (accessory) socket or directly from a battery of the vehicle. Alternatively, the power sources may be obtained from a different battery provided separately from the battery of the vehicle.

In the first embodiment, the heating device 20 is attached to the cap 14 so that the heating device 20 is wound around a periphery of the cap 14 in order to secure a contact surface area between the heating device 20 and the cap 14. However, the heating device may be attached to the cap 14 in any manner as long as the heat generated by the heating device 20 can be efficiently transferred to the cap 14.

Next, operations of the puncture repair device 1 according to the first embodiment will be described.

First, by causing the compressor 10 to be operated, the compressed air is supplied from the compressor 10 to the interior of the vessel 12 via the second hose 18. Then, the puncture repair liquid contained in the interior of the vessel 12 is pumped into the cavity of the punctured tire T via the first hose 16 together with the compressed air. As a result, the puncture repair liquid can be pumped into a puncture hole so as to seal the puncture hole. After that, the compressed air is further filled into the tire T until a pressure therein reaches a prescribed pressure.

In the first embodiment, the heating device 20 conducts the heat with respect to the cap 14 by making direct contact with the cap 14 and thereby heats the puncture repair liquid that passes through the opening of the vessel 12. Therefore, the puncture repair liquid is heated by the heating device 20 via the cap 14. As a result, even when the puncture repair device 1 is used in low-air-temperature environments, the viscosity of the puncture repair liquid is lowered, and thereby, the time to repair the punctured tire T can be reduced.

Figure 2:
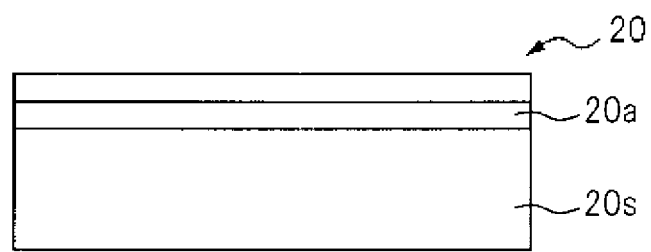
FIG. 2 is a plan view illustrating a side of a heating device according to the first embodiment that abuts against a cap.

FIG. 2 is a plan view illustrating a side of the heating device 20 according to the first embodiment that abuts against the cap 14, before the heating device 20 is attached to the cap 14. In the first embodiment, an attachment portion 20a is provided on a surface 20s, which makes contact with the cap 14, of the heating device 20. The attachment portion 20a is formed by an adhesive tape that uses adhesive made from acrylic, EVA, or the like, for example. When the puncture repair device 1 is stored, a release paper (not illustrated in the drawings) is attached to the attachment portion 20a. When the heating device 20 is used, this release paper is peeled off from the attachment portion 20a, and it becomes possible to attach the heating device 20 to the periphery of the cap 14 as illustrated in FIG. 1.

The attachment portion 20a may be formed by various types of adhesive tapes, a hook and loop fastener (Magic Tape (registered trademark), for example), and the like. Alternatively, the heating device 20 may be removably fixed to the cap 14 by using a fixture (not illustrated in the drawings) such as a clamping band and a clip, for example. Accordingly, the heating device 20 can be fixed to the cap 14 so as to make direct contact with the cap 14.

Therefore, when the puncture repair device 1 is used in low-air-temperature environments and the viscosity of the puncture repair liquid is high, a user can selectively, that is, removably attach the heating device 20 to the cap 14, which is advantageous.

Although the heating device 20 includes the attachment portion 20a in the first embodiment, the heating device 20 does not include the attachment portion 20a in another embodiment. Although the heating device 20 is removably attached to the cap 14 in the first embodiment, in yet another embodiment, the heating device 20 is adhered to the cap 14 in advance so that it cannot be removed.

Although the heating device 20 conducts the heat to the cap 14 by making direct contact with the cap 14 in the first embodiment, the heating device 20 may be arranged near the cap 14 and may indirectly conduct the heat to the cap 14. In this case, the heating device 20 may be an electric heater, a halogen heater, a gas heater, a gas burner, an open fire that is generated by burning combustibles such as solid fuels, and the like.

(Modified Examples)

Figure 3:
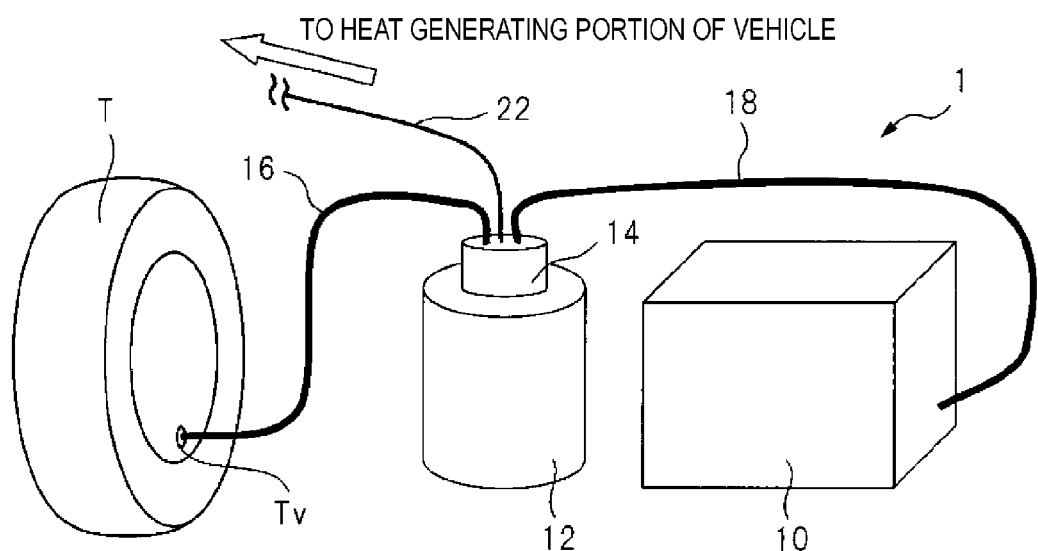
FIG. 3 is a schematic diagram illustrating a modified example of the heating device.

FIG. 3 is a schematic diagram illustrating a modified example of the heating device. The heating device is a heat generating part (not illustrated in the drawings) of the vehicle, such as an engine, an exhaust device, and a brake, in this modified example. In this case, the cap 14 is connected to the heat generating part of the vehicle via a heat conductor 22, which is formed by a metal conducting wire, a heat pipe, and the like, so that the heat is conducted to the cap 14. Accordingly, the heat is conducted from the heat generating part of the vehicle to the cap 14. This modified example has an advantage in which the puncture repair liquid can be heated by using normally wasted heat that is discharged by the vehicle.

It is preferable that the heat conductor 22 be removably attached to the cap 14 even in this modified example. The heat conductor 22 is attached to the cap 14 using an adhesive tape (not illustrated in the drawings), for example. Alternatively, the cap 14 may include a clip (not illustrated in the drawings), and the heat conductor 22 may be fixed to the cap 14 by clamping one end of the heat conductor 22 using the clip. Meanwhile, the heat conductor 22 may be fixed to the cap 14 by welding one end of the heat conductor 22 to the cap 14, for example, so that the heat conductor 22 is attached to the cap 14 in a fixed manner.

The heating device 20, which heats the puncture repair liquid by conducting the heat to the cap 14, has been described above with reference to several examples. However, the heating device 20 is not limited to the examples described above as long as the heating device 20 conducts the heat to the puncture repair liquid via the cap 14.

(Second Embodiment)

Next, the puncture repair device 1 according to a second embodiment will be described with reference to FIG. 4. Note that only differences from the first embodiment will be described with respect to the second embodiment.

Figure 4:
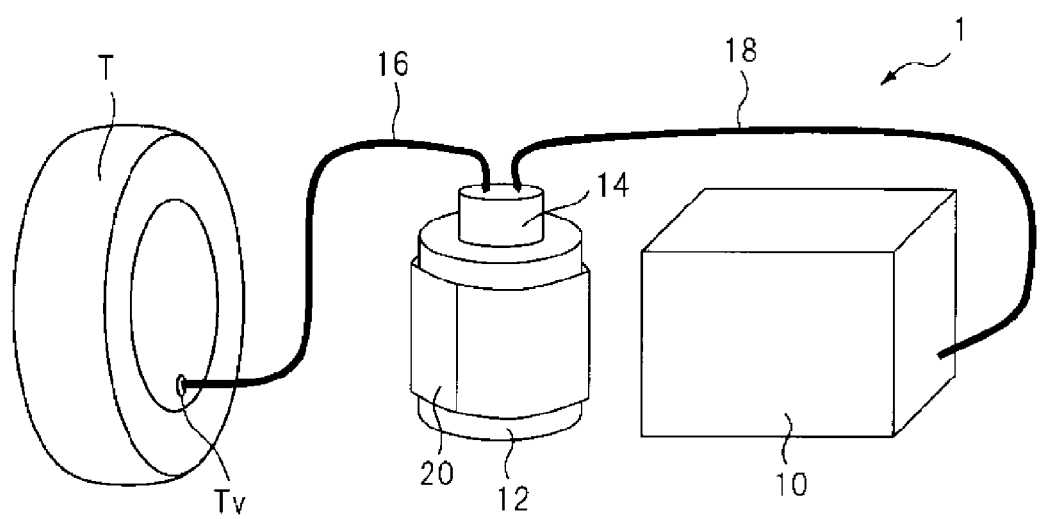
FIG. 4 is a schematic diagram of a puncture repair device according to a second embodiment of the present technology.

FIG. 4 is a schematic diagram of the puncture repair device 1 according to the second embodiment of the present technology. In FIG. 4, the second embodiment is illustrated in which the heating device 20, which is a disposable pocket warmer, for example, is attached to the vessel 12 by being wound around the vessel 12, unlike the first embodiment. Accordingly, the puncture repair liquid contained in the interior of the vessel 12 can be heated. Therefore, as in the first embodiment, even when the puncture repair device 1 is used in low-air-temperature environments, the puncture repair liquid is heated by the heating device 20 via the vessel 12. As a result, the viscosity of the puncture repair liquid is lowered, and thereby, the time to repair the punctured tire T can be reduced.

(Third Embodiment)

Next, the puncture repair device 1 according to a third embodiment will be described with reference to FIG. 5. Note that only differences from the first embodiment will be described also with respect to the third embodiment.

Figure 5:
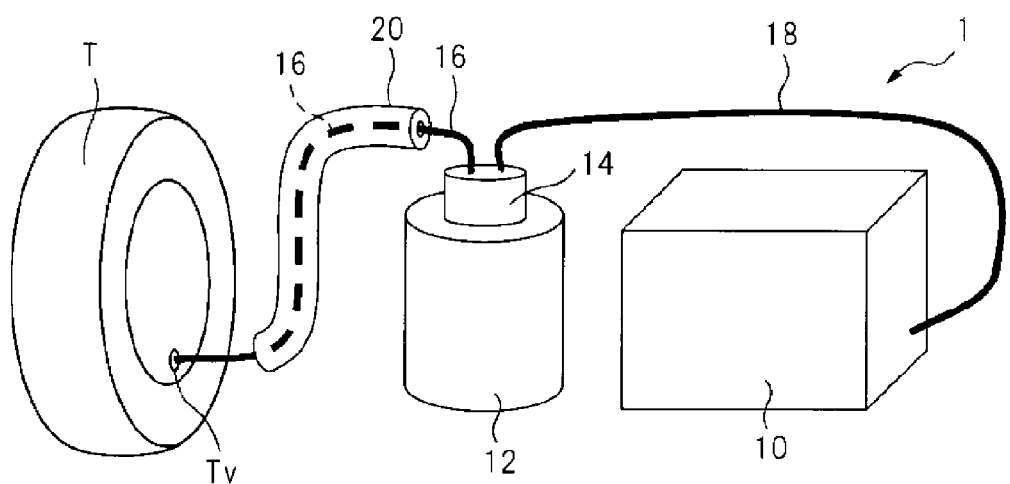
FIG. 5 is a schematic diagram of a puncture repair device according to a third embodiment of the present technology.

FIG. 5 is a schematic diagram of the puncture repair device 1 according to the third embodiment of the present technology. In FIG. 5, the third embodiment is illustrated in which the heating device 20, which is a disposable pocket warmer, for example, is provided being wound around the first hose 16, unlike the first embodiment. Accordingly, it is possible to heat the puncture repair liquid passing through the interior of the first hose 16. Therefore, as in the first embodiment, even when the puncture repair device 1 is used in low-air-temperature environments, the puncture repair liquid is heated by the heating device 20 via the first hose 16. As a result, the viscosity of the puncture repair liquid is lowered, and thereby, the time to repair the punctured tire T can be reduced.

(Other Embodiments)

The first to third embodiments have been described above. In the first to third embodiments, the heating device 20 heats the puncture repair liquid via the cap 14, the vessel 12, and the first hose 16. However, it is preferable that the puncture repair device 1 be provided with a plurality of heating devices 20 and the puncture repair liquid be heated via the cap 14 and the vessel 12, the vessel 12 and the first hose 16, the first hose 16 and the cap 14, or the cap 14, the vessel 12, and the first hose 16. Alternatively, it is preferable that, by applying one of the heating devices 20 extensively, the puncture repair liquid be heated via two of or all three of the cap 14, the vessel 12, and the first hose 16.

This is because, by heating the puncture repair liquid via a plurality of portions of the cap 14, the vessel 12, and the first hose 16, it is possible to increase the heating effect and thereby to further reduce the time to repair the punctured tire T.

Further, the cap 14 and the vessel 12 may be formed of a low-cost material, such as PP and PET, for example. Further, the hoses 16 and 18 may be formed of a rubber material, for example. However, it is even more preferable that a portion to which the heat is conducted by the heating device 20 be formed of heat conductive material, the portion being a portion of the cap 14, the vessel 12, and/or the first hose 16. This is because the heat conducted from the heating device 20 can be efficiently conducted to the puncture repair liquid.

Note that the heat conductive material refers to material having heat conductivity ranging from 15 to 500 [$Wm^{-1}K^{-1}$] in the present technology. The heat conductive material includes metals (copper, silver, iron, stainless steel, etc.), silicon, graphite, and the like, for example.

Working Examples

The effect of the present technology will be described below in more detail with reference to working examples.

In the working examples described below, the time to pump the puncture repair liquid into the cavity of the tire T will be measured under a −10° C. environment when a disposable pocket warmer is attached, as the heating device 20, to each portion of the cap 14, the vessel 12, and the first hose 16 or to the plurality of portions of the cap 14, the vessel 12, and the first hose 16.

Note that the puncture repair device 1 is used in a state in which the heat is conducted to each of the portion from the disposable pocket warmer, which is generating sufficient heat, and the puncture repair liquid is sufficiently heated.

A conventional example and the working examples of the puncture repair device used in a test will be described below.

(Conventional Example)

The conventional example is a conventional puncture repair device, which is the puncture repair device of the above-described embodiment from which the heating device 20 is removed.

(Working Examples 1 to 6)

Working Examples 1 to 6 are respectively the puncture repair device 1 of the present technology to which a disposable pocket warmer is attached, as the heating device 20, to the portions marked with "O" in the table shown below.

In the above-described test conditions, the time to pump the puncture repair liquid into the tire T has been measured. Test results are shown below.

TABLE 1

| | | Conventional example | Working example 1 | Working example 2 | Working example 3 |
|---|---|---|---|---|---|
| Heating portions | Cap | — | O | — | — |
| | Vessel | — | — | O | — |
| | Hose | — | — | — | O |
| Time reduction index | | — | B | C | D |

| | | Working example 4 | Working example 5 | Working example 6 |
|---|---|---|---|---|
| Heating portions | Cap | O | O | O |
| | Vessel | O | — | O |
| | Hose | — | O | O |
| Time reduction index | | A | B | A |

Here, the time reduction index is an index that indicates a reduction ratio of the time that is reduced by the puncture repair device according to the working examples with respect to the conventional example, where the time is the time required to pump the puncture repair liquid into the tire T. Time reduction indices A to D indicate the reduction ratios of the time that is reduced with respect to the conventional example in the following ranges.

A: 16% or greater
B: 11 to 16%
C: 6 to 11%
D: 1 to 6%

Thus, when the heating device 20 is attached to one of the cap 14, the vessel 12, and the first hose 16 or to a plurality of portions of the cap 14, the vessel 12, and the first hose 16 so as to heat the puncture repair liquid, it is possible to reduce the time to pump the puncture repair liquid into the cavity of the tire T. The description made above has demonstrated that the puncture repair device of the present technology can reduce the time to repair the punctured tire in comparison with the conventional puncture repair device.

The present technology is defined as described below.

(1) A puncture repair device is provided with a compressor, a vessel to which compressed air from the compressor is supplied and that contains a puncture repair liquid that is pumped into a cavity of a tire, and a heating device that heats the puncture repair liquid.

(2) The puncture repair device according to (1) is further provided with a cap that is attached to an opening of the vessel through which the puncture repair liquid passes. The heating device heats the puncture repair liquid via the cap.

(3) In the puncture repair device according to (1), the heating device heats the puncture repair liquid via the vessel.

(4) The puncture repair device according to (1) is further provided with a hose that communicatively connects an interior of the vessel with the cavity of the tire and through which the puncture repair liquid passes. The heating device heats the puncture repair liquid via the hose.

(5) In the puncture repair device according to (2), the heating device conducts heat by making direct contact with the cap.

(6) In the puncture repair device according to (3), the heating device conducts heat by making direct contact with the vessel.

(7) In the puncture repair device according to (4), the heating device conducts heat by making direct contact with the hose.

(8) In the puncture repair device according to any one of (5) to (7), the heating device can be attached to and removed from a portion with which the heating device makes contact.

(9) In the puncture repair device according to any one of (1) to (8), the heating device is a heat generating portion of a vehicle and conducts heat via a heat conductor.

(10) In the puncture repair device according to one any of (1) to (9), a portion to which heat is conducted by the heating device is formed of a heat conductive material.

What is claimed is:

1. A puncture repair device, comprising:
   a compressor;
   a vessel to which compressed air from the compressor is supplied and that contains a puncture repair liquid that is pumped into a cavity of a tire;
   a heating device that heats the puncture repair liquid;
   a cap that is attached to an opening of the vessel through which the puncture repair liquid passes, wherein the heating device heats the puncture repair liquid via the cap and conducts heat by making direct contact with the cap.

2. The puncture repair device according to claim 1, wherein the heating device heats the puncture repair liquid via the vessel.

3. The puncture repair device according to claim 1, further comprising: a hose that communicatively connects an interior of the vessel with the cavity of the tire and through which the puncture repair liquid passes, wherein the heating device heats the puncture repair liquid via the hose.

4. The puncture repair device according to claim 2, wherein the heating device conducts heat by making direct contact with the vessel.

5. The puncture repair device according to claim 3, wherein the heating device conducts heat by making direct contact with the hose.

6. The puncture repair device according to claim 1, wherein the heating device can be attached to and removed from a portion of the puncture repair device with which the heating device makes contact.

7. The puncture repair device according to claim 1, wherein the heating device is a heat generating portion of a vehicle and conducts heat via a heat conductor.

8. The puncture repair device according to claim 1, wherein a portion of the puncture repair device to which heat is conducted by the heating device is formed of a heat conductive material.

9. The puncture repair device according to claim 4, wherein the heating device can be attached to and removed from a portion of the puncture repair device with which the heating device makes contact.

10. The puncture repair device according to claim 5, wherein the heating device can be attached to and removed from a portion of the puncture repair device with which the heating device makes contact.

11. The puncture repair device according to claim 1, wherein the heating device is a heat generating portion of a vehicle and conducts heat via a heat conductor.

12. The puncture repair device according to claim 1, wherein a portion of the puncture repair device to which heat is conducted by the heating device is formed of a heat conductive material.

13. The puncture repair device according to claim 2, wherein the heating device is a heat generating portion of a vehicle and conducts heat via a heat conductor.

14. The puncture repair device according to claim 2, wherein a portion of the puncture repair device to which heat is conducted by the heating device is formed of a heat conductive material.

15. The puncture repair device according to claim 3, wherein the heating device is a heat generating portion of a vehicle and conducts heat via a heat conductor.

16. The puncture repair device according to claim 3, wherein a portion of the puncture repair device to which heat is conducted by the heating device is formed of a heat conductive material.

17. A puncture repair device, comprising:
    a compressor;
    a vessel to which compressed air from the compressor is supplied and that contains a puncture repair liquid that is pumped into a cavity of a tire;
    a heating device that heats the puncture repair liquid; and
    a hose that communicatively connects an interior of the vessel with the cavity of the tire and through which the puncture repair liquid passes, wherein the heating device heats the puncture repair liquid via the hose and conducts heat by making direct contact with the hose.

18. A puncture repair device, comprising:
    a compressor;
    a vessel to which compressed air from the compressor is supplied and that contains a puncture repair liquid that is pumped into a cavity of a tire;
    a heating device that heats the puncture repair liquid, wherein the heating device is a heat generating portion of a vehicle and conducts heat via a heat conductor.

* * * * *